July 9, 1929. A. P. BARNES 1,720,115
FRUIT HOLDER
Filed March 16, 1928
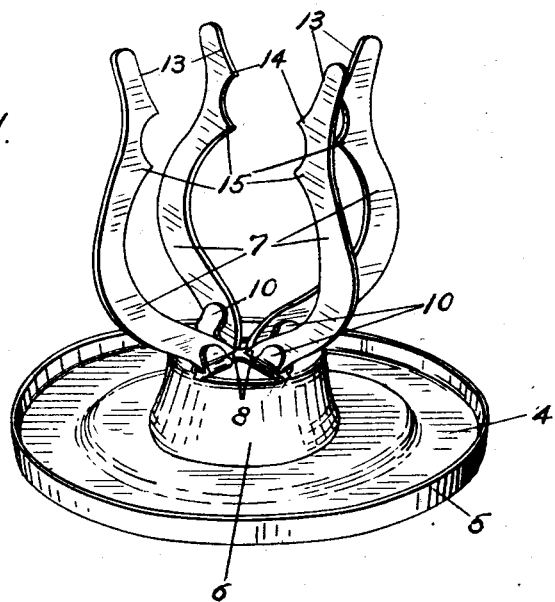
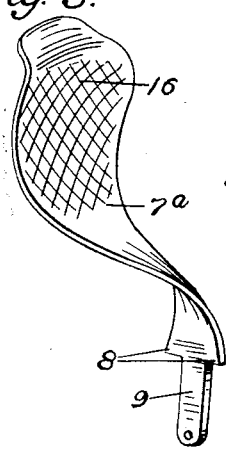
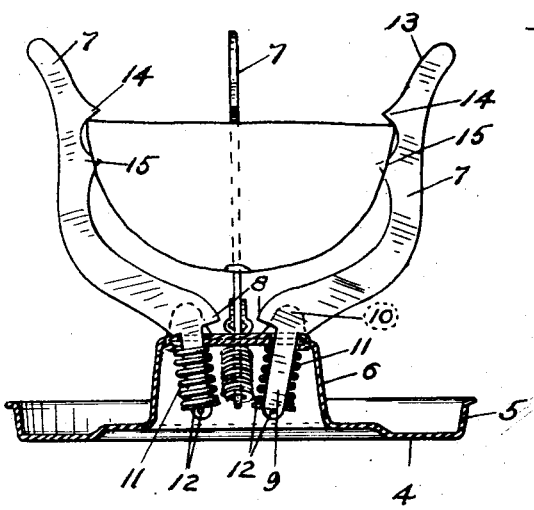
INVENTOR
ALVIN P. BARNES
BY
ATTORNEY Patented July 9, 1929.

1,720,115

UNITED STATES PATENT OFFICE.

ALVIN P. BARNES, OF MINNEAPOLIS, MINNESOTA, ASSIGNOR OF ONE-HALF TO HERBERT H. O'HARA, OF MINNEAPOLIS, MINNESOTA.

FRUIT HOLDER.

Application filed March 16, 1928. Serial No. 262,094.

This invention relates to means for holding and serving edibles such as a piece of fruit, while the same is being eaten from, and the primary object is to provide means of a novel, efficient and practical nature for firmly supporting a half piece of fruit, such as oranges, grape-fruits, or cantaloupes, while the heart or meat of the same is being eaten, so that the person eating may do so very conveniently with the aid of only one hand and need not hold or steady the piece with the other hand. It is a notoriously common objection that when eating from, for instance, a piece of grape-fruit that is served on a plate or saucer, a person must usually tightly grip the fruit with one hand while manipulating a spoon with the other, and in so doing, especially with well sugared and juicy fruit, the hand holding the fruit usually becomes very sticky, the fruit is very apt to slip about, and the process becomes very disagreeable, with the result that many people who like the health giving citrous fruits and small luscious melons do not eat them, or at least do not eat them to the extent that they would if they could do so with a greater degree of neatness and ease. My invention, therefore, comprises an efficient fruit clamping or holding device, and embodies, as an additional feature, a support or base for the device, in the form of a tray which catches and holds any juices which may drip from the fruit, so that such juices will not soil the hands or the table linen.

In the accompanying drawing, forming a part of this specification:

Fig. 1 is a perspective view of the device.

Fig. 2 is a central or diametrical sectional elevation, showing the position of various parts when a piece of fruit has been inserted in the device.

Fig. 3 is a detail view showing a modified form of gripping arm.

Referring to the drawing more particularly and by reference characters 4 designates a shallow tray, having a marginal flange 5 and a central hollow hub 6. A series of curved gripping arms 7 are mounted for pivotal action in the hub 6 whereby they may be moved outwardly from the normal positions as shown in Fig. 1. The lower ends of these arms are provided with shoulders 8, adapted to rest on the hub 6, and fingers 9 that extend through slots and to the interior of the hub 6. The slots are of sufficient length to permit the tilting therein of the fingers, and upon the hub is secured, as by welding or soldering, a small bracket having pairs of lips or lugs 10 for guiding the arms and retaining them in radially movable directions only. A coil spring 11 is mounted upon each finger 9, and is held partly compressed by pins and washers 12. Thus, the springs 11 will yieldingly hold the shoulders 8 seated, and by so doing will normally hold the arms 7 in relatively inward positions. At their upper ends the arms 7 are provided with converging edge portions 13, so that when the piece of fruit is pressed down between them the arms will automatically spread out, radially, until the piece is well down and firmly held in place. The arms are provided with upper teeth 14 and lower teeth 15, with respect to which the fruit piece is pressed preferably as shown in Fig. 2. In such a manner it will be seen that the teeth 14 will particularly serve to prevent the fruit from slipping out upwardly, while the primary function of the teeth 15 is to engage and firmly grip the fruit to steady it with respect to the base 4—6.

In the modification of the gripping arm $7^a$, as shown in Fig. 3, it will be seen that instead of providing it with teeth, like 14 and 15, I have widened the arm considerably, given it a quarter twist, and, at its upper end, have provided it with corrugations 16. With this type of arm in use, fewer than four of them may be used, if so desired, as the width of the gripping portion of the arm permits a very effective fruit holder.

It is understood that suitable modifications may be made in the general design and structural details of the invention as herein shown, provided, however, that said modifications come within the spirit and scope of the appended claims.

Having now therefore fully shown and described my invention, what I claim to be new and desire to protect by Letters Patent is:

1. A fruit holder of the character described, comprising a tray having a central hub portion, radially disposed fruit clamping arms pivotally mounted to the hub portion and extending upwardly and outwardly therefrom, and spring means for yieldingly urging said arms toward each other and downwardly against the hub.

2. A fruit holder of the character described comprising a tray having a central hub portion, radially disposed fruit clamping arms pivotally mounted to the hub portion, and extending upwardly and outwardly therefrom, and springs mounted within the hub and about the respective arms for acting upon the lower ends of the arms to press the upper ends of the arms toward each other.

3. A fruit holder of the character described comprising a tray having an outer flange and an inner hub, a series of fruit clamping arms extending down through the top of the hub for pivotal engagement therewith, and a series of compressed springs surrounding the arm portions within the hub and tending to press them downwardly to effect an inward clamping action to the upper ends of the arms.

4. A fruit holder of the character described comprising a tray having an outer flange and an inner hub, a series of fruit clamping arms extending down through the top of the hub for pivotal engagement therewith, and a series of compressed springs surrounding the arm portions within the hub and tending to press them downwardly to effect an inward clamping action to the upper ends of the arms, said arms being provided with shoulders for stopping and pivoting contact with the upper end of the hub.

In testimony whereof I affix my signature.

ALVIN P. BARNES.